United States Patent
Gupta

(10) Patent No.: US 11,430,216 B2
(45) Date of Patent: Aug. 30, 2022

(54) DISPLAYING DATA RELATED TO OBJECTS IN IMAGES

(71) Applicant: Hewlett-Packard Development Company, L.P., Spring, TX (US)

(72) Inventor: Mohit Gupta, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/046,074

(22) PCT Filed: Oct. 22, 2018

(86) PCT No.: PCT/US2018/056920
§ 371 (c)(1),
(2) Date: Oct. 8, 2020

(87) PCT Pub. No.: WO2020/086055
PCT Pub. Date: Apr. 30, 2020

(65) Prior Publication Data
US 2021/0295046 A1    Sep. 23, 2021

(51) Int. Cl.
*G06V 20/20* (2022.01)
*G06F 16/53* (2019.01)

(52) U.S. Cl.
CPC .............. *G06V 20/20* (2022.01); *G06F 16/53* (2019.01)

(58) Field of Classification Search
CPC ........ G06V 20/20; G06V 20/68; G06F 16/53; G06F 3/147; G06F 16/58; G09G 2340/14; G09G 2354/00; G09G 5/14; G06T 19/006
See application file for complete search history.

(56) References Cited

U.S. PATENT DOCUMENTS

| | | | |
|---|---|---|---|
| 8,687,021 B2 | 4/2014 | Bathiche et al. | |
| 9,632,654 B1 | 4/2017 | Elassaad | |
| 10,013,531 B2 | 7/2018 | Richards et al. | |
| 2007/0226631 A1 | 9/2007 | Tevis | |
| 2008/0141351 A1 | 6/2008 | Park | |
| 2013/0044128 A1 | 2/2013 | Liu et al. | |
| 2014/0123325 A1* | 5/2014 | Jung | H04L 63/108 726/30 |

(Continued)

FOREIGN PATENT DOCUMENTS

| EP | 3343441 A1 | 7/2018 |
|---|---|---|
| TW | 201221912 A | 6/2012 |

(Continued)

OTHER PUBLICATIONS

Ajanki Antti et al., An Augmented Reality Interface to Contextual Information, Jun. 2011 ACM.

(Continued)

*Primary Examiner* — Jitesh Patel
(74) *Attorney, Agent, or Firm* — Hanley, Flight, Zimmerman, LLC

(57) ABSTRACT

An example of a non-transitory computer-readable medium storing machine-readable instructions. The instructions may cause a controller to receive an image and detect an object in the image. Based on a contextual setting of the electronic device, overlay data may be retrieved from a database or a remote electronic device to be visually associated with the object on a display.

13 Claims, 5 Drawing Sheets

(56) References Cited

U.S. PATENT DOCUMENTS

| | | | |
|---|---|---|---|
| 2014/0232750 A1* | 8/2014 | Price | G06F 16/954 |
| | | | 345/633 |
| 2014/0233859 A1* | 8/2014 | Cho | G06T 7/00 |
| | | | 382/197 |
| 2015/0262208 A1 | 9/2015 | Bjontegard | |
| 2017/0094007 A1* | 3/2017 | Demsey | G06F 16/9574 |
| 2018/0150899 A1* | 5/2018 | Waldron | G06F 3/017 |
| 2018/0190375 A1 | 7/2018 | Chapela et al. | |
| 2018/0260843 A1 | 9/2018 | Hiranandani et al. | |
| 2018/0293771 A1* | 10/2018 | Piemonte | G06Q 20/123 |

FOREIGN PATENT DOCUMENTS

| | | |
|---|---|---|
| TW | 201826225 A | 7/2018 |
| TW | 201833840 A | 9/2018 |
| WO | WO-2014058357 A1 | 4/2014 |

OTHER PUBLICATIONS

Ajanki. A et al., Contextual information access with augmented reality, 2010, IEEE.

Grubert Jens et al., Towards Pervasive Augmented Reality Context-Awareness in Augmented Reality, Mar. 17, 2016, IEEE.

\* cited by examiner

DISPLAYING DATA RELATED TO OBJECTS IN IMAGES

BACKGROUND

Augmented reality (AR) may include receiving images and displaying the images while displaying overlay data associated with objects in the images. Objects in the images may be identified and corresponding overlay data retrieved and displayed on the images in association with the objects.

BRIEF DESCRIPTION OF THE DRAWINGS

Various examples will be described below referring to the following figures.

DETAILED DESCRIPTION

Figure 1:
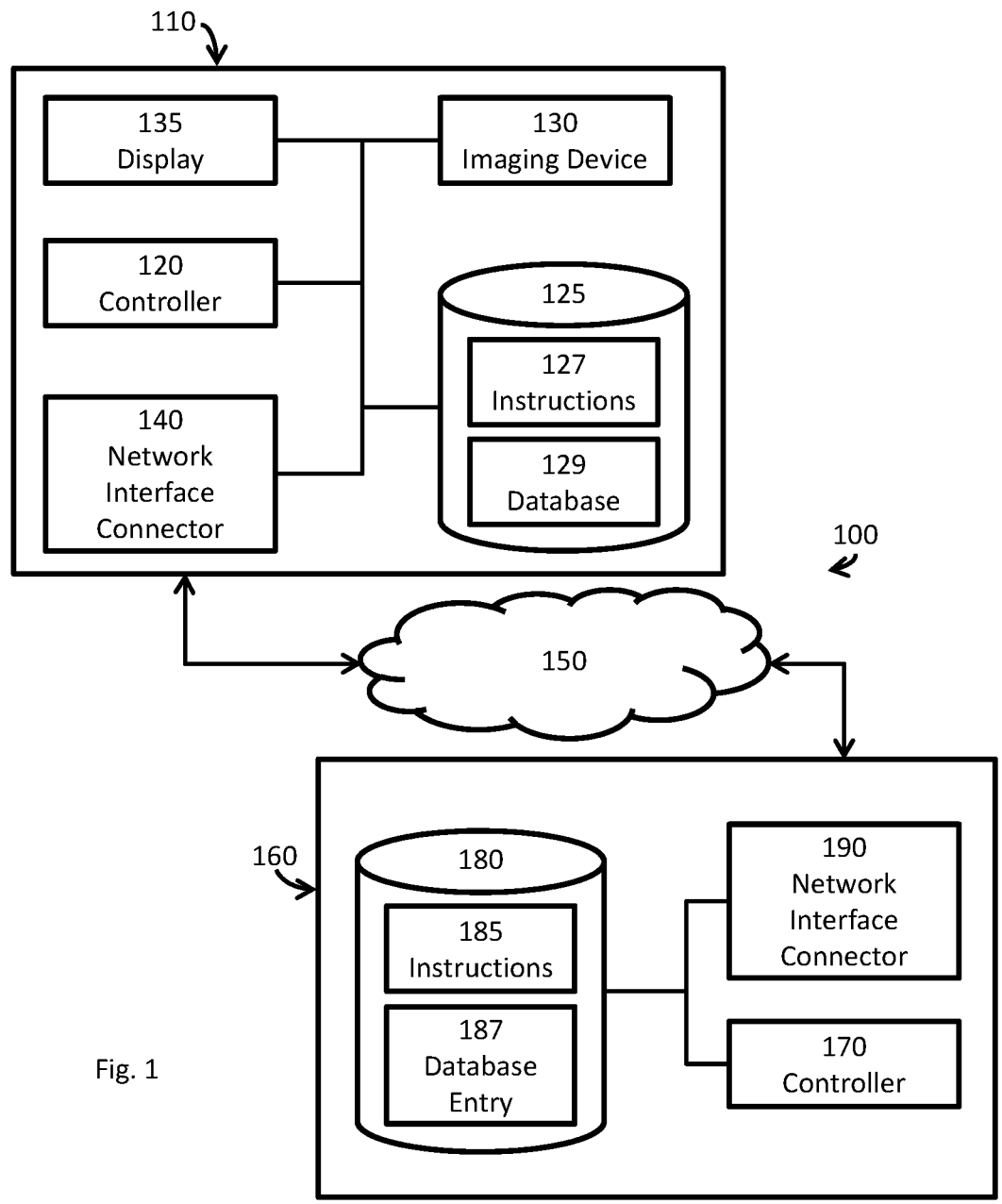
FIG. 1 shows a system with an AR device coupled to a second electronic device.

AR devices may overlay data on a display to provide information about an object detected in the field of view. As the amount of overlay data corresponding to an object is potentially voluminous, an AR device may display overlay data within a specific field of use. For example, an AR device used by a customer in a retail store may identify products for sale and display price information for the products. An AR device used by an employee in the retail store may provide overlay data regarding the number of items in stock for a product and the date and number of the next restocking of the product. When the customer or employee leaves the store, they may use an AR device to identify and display the quickest route home.

By determining the contextual setting of an AR device, the same AR device may be used in connection with different sources of overlay data to provide a context-appropriate display of overlay data. A user may work at a retail store. After clocking in to work, the AR device may provide overlay data related to stocking of products on the shelves. After clocking out of work, the contextual setting may switch from employee at the store to a customer at the store as the user sees the pricing of products while shopping before returning home. After exiting the store, the contextual setting may switch and the AR device may identify and display the quickest route home. The appropriate overlay data for the contextual setting may not be stored on the local device of the AR device, but in a remote database. As the contextual setting of the AR device changes, the overlay data stored on the local device may be modified via a connection with the remote database. The AR device may identify an object for which overlay data is lacking both on the local device and in the remote database and flag the object for further analysis and potential addition to a database. A user's interests may be tracked and updated to affect the contextual setting.

In one example in accordance with the present disclosure, an apparatus is provided. The apparatus comprises a non-transitory computer-readable medium storing machine-readable instructions that, when executed by a controller of an electronic device, cause the controller to: receive an image via an imaging device of the electronic device; detect an object in the image; determine a contextual setting of the electronic device; query a database stored in the electronic device for overlay data related to the object based on the contextual setting; when the overlay data is stored in the database, retrieve the overlay data from the database; when the overlay data is stored on a remote electronic device, send a message to a second electronic device, the message including identification data of the object and a request for the overlay data, and receive the overlay data from the remote electronic device via the second electronic device; and visually associate the overlay data with the object on a display of the electronic device.

In one example in accordance with the present disclosure, an apparatus is provided. The apparatus comprises a non-transitory computer-readable medium storing machine-readable instructions that, when executed by a controller of an electronic device, cause the controller to: receive a user identification; determine a contextual setting of the electronic device based on the user identification; send a request to a second electronic device for a database entry based on the contextual setting; receive the database entry from the second electronic device; store the database entry in a database stored in the electronic device; receive an image via an imaging device of the electronic device; detect an object in the image; query the database for overlay data related to the object; retrieve the overlay data from the database, the overlay data corresponding to the database entry; and visually associate the overlay data with the object on a display of the electronic device.

In one example in accordance with the present disclosure, an apparatus is provided. The apparatus comprises a non-transitory computer-readable medium storing machine-readable instructions that, when executed by a controller of an electronic device, cause the controller to: receive a user identification from a second electronic device; determine a contextual setting of the second electronic device based on the user identification; select an overlay data based on the contextual setting; send the overlay data to the second electronic device; receive a message from the second electronic device, the message including identification data of an object; select a second overlay data based on the identification data and the contextual setting; and send the second overlay data to the second electronic device.

FIG. 1 shows a system 100 with an AR device 110 coupled to a second electronic device 160. AR device 110 may include a controller 120, a computer-readable medium 125, an imaging device 130, a display 135, and a network interface connector 140. The second electronic device 160 may include a controller 170, a computer-readable medium 180, and a network interface connector 190. The network interface connectors 140, 190 may couple the AR device 110 and the second electronic device 160 via a wired connection, such as an Ethernet cable or Universal Serial Bus (USB) or via a wireless connection, such as WiFi. The network interface connectors 140, 190 may include different kinds of connectors, such as network interface connector 140 including a WiFi connector and network interface connector 190 including a cabled Ethernet connector. The AR device 110 may be coupled to the second electronic device 160 via the Internet (or another suitable network, such as a local area network) 150.

In various examples, the controllers 120, 170 may comprise a microprocessor, a microcomputer, a microcontroller, a field programmable gate array (FPGA), or discrete logic to execute machine-readable instructions. The controllers 120, 170 may be part of AR device 110 or second electronic device 160, respectively, which may include devices such as laptop or desktop computers, servers, cell phones, tablets, or Internet of things (IoT) devices. The controller 120 may be coupled to the computer-readable medium 125, imaging device 130, display 135, and network interface connector 140, such as via a bus. The controller 170 may be coupled to the computer-readable medium 180 and network interface connector 190, such as via a bus.

The computer-readable media 125, 180 may include a hard drive, solid state drive (SSD), flash memory, electrically erasable programmable read-only memory (EEPROM), or random access memory (RAM). The computer-readable medium 125 may store instructions 127 and a database 129. The computer-readable medium 180 may store instructions 185 and a database entry 187. The instructions 127, 185 may be for execution by the controllers 120, 170, respectively. The instructions 127, 185 may include machine-readable instructions to execute the methods and disclosures depicted in the flow diagrams of FIGS. 2, 3, and 4 and disclosed elsewhere in this specification. The Database 129 may include overlay data. The database entry 187 may be stored in a database on the computer-readable medium 180.

The imaging device 130 may be a camera that acquires images as still photos or video. The images may be black and white or color images. The display 135 may be a light-emitting diode (LED) display or other display, such as one used in a smart phone or tablet. The display 135 may be a transparent or translucent display so that the user can view the surrounding environment through the display 135, such as a visor comprising glass or plastic onto which images may be placed. The transparent or translucent display 135 may display information such that a portion of the display becomes less transparent or even opaque.

Figure 2:
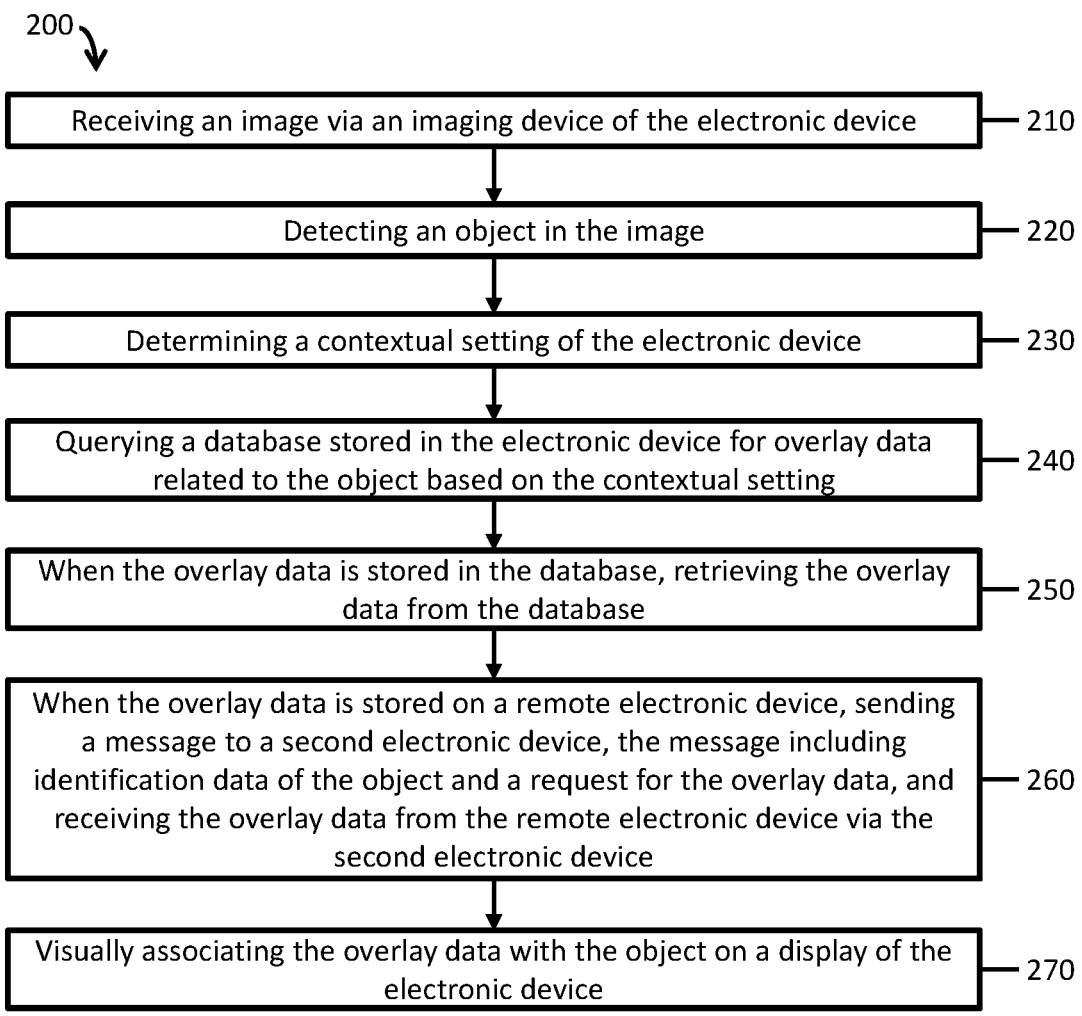
FIG. 2 shows a flow diagram of a method to retrieve overlay data based on a contextual setting and to visually associate the overlay data with an object on a display in accordance with various examples.

FIG. 2 shows a flow diagram of a method 200 to retrieve overlay data based on a contextual setting and to visually associate the overlay data with an object on a display in accordance with various examples. The method 200 includes receiving an image via an imaging device of the electronic device (210). The method 200 includes detecting an object in the image (220). The method 200 includes determining a contextual setting of the electronic device (230). The method 200 includes querying a database stored in the electronic device for overlay data related to the object based on the contextual setting (240). The method 200 includes, when the overlay data is stored in the database, retrieving the overlay data from the database (250). The method 200 includes, when the overlay data is stored on a remote electronic device, sending a message to a second electronic device, the message including identification data of the object and a request for the overlay data, and receiving the overlay data from the remote electronic device via the second electronic device (260). The method 200 includes visually associating the overlay data with the object on a display of the electronic device (270).

In various examples, the AR device may connect to a second electronic device via the network interface connector. The second electronic device may be a server, laptop or desktop computer, cell phone, or other device. The AR device may function without an active connection to the second electronic device, independently acquiring images, identifying objects in the images, and retrieving and displaying overlay data. The AR device may utilize the second electronic device for additional functionality. For example, the controller on the AR device may have limited processing power. The AR device may transmit the image to the second electronic device, and the second electronic device identifies objects in the images and retrieves overlay data for the AR device to display. The AR device may identify objects in the images but have limited storage for overlay data. The AR device may query a database in the AR device for overlay data to display. If the overlay data is not in the database in the AR device, the AR device may send identification data of the object to the second electronic device to request related overlay data.

The AR device may include a cell phone or a tablet running an AR application. The cell phone may include a camera to acquire images and display the images on the display. The overlay data may be added to the images displayed on the display. The images may include a still photo taken with the camera, to which the overlay data is added. For example, a user may cause the AR application to take a picture of an object, thereby requesting overlay data regarding the object. The display may display the picture on a portion of the cell phone display and add overlay data. The overlay data may be superimposed directly on the image or shown adjacent to the picture. Boxes or other shapes may be superimposed on the image to visually associate what object was detected and the corresponding overlay data. Such shapes may be color-coded to match the overlay data. The selection of the color coding may be based on the picture to ensure the display of the shapes or overlay data are visible on the display without being lost in the pictures, such as being the same color as the background of the image.

The contextual setting is the context in which the AR device is being used. The contextual setting may be based on factors such as the location, time of day, date, and the user. For example, the AR device may recognize the location is a work location and determine the contextual setting includes a work component. The AR device may recognize a location corresponds to a home, specifically the user's home, and determine the contextual setting includes a home component. The AR device may recognize a location corresponds to a store and determine the contextual setting includes a shopping component.

In various examples, the contextual setting may be based on the time of day. At 8:00 in the morning, the contextual setting may include a commuting component. This contextual setting may consider the location, such as the AR device being at a home location, and may consider a work schedule, such as noting from an e-mail or website that the user is scheduled to start work at 8:30 in the morning. At 8:30 in the morning, the contextual setting may no longer include a commuting component, which may be determined in part by arrival at a work location. Shortly before noon, the contextual setting may be determined and changed to include a lunch component. This change in contextual setting may result in the selection of overlay data relating to nearby restaurants or pricing and menu options of restaurants in the AR device's field of view. At 5:30 in the evening, the AR device may determine the contextual setting should no longer include a work component. A dinner component or commuting component may be included at that time, based on records of prior behavior or calendar entries for the user.

The overlay data may include different formats, such as text, pictures, or videos. Interaction between the user and AR device may allow the overlay data to be modified. For example, the AR device may initially detect a restaurant as an object in an image. The AR device may provide overlay data identifying the restaurant by name and indicating whether or not it is open. The user may indicate an interest in the restaurant, causing the AR device to display a menu or reviews. The user may continue to indicate an interest, causing the AR device to interact with a reservation application of the restaurant over the internet, determining the availability of immediate seating or reservations and making dinner reservations for the user. The AR device may detect a car battery in the image and determine the contextual setting includes automotive repair. The overlay data may describe the model of the car battery and correlate it with known cars owned by the user, indicating whether the car battery is suitable as a replacement battery. The AR device may display overlay data comprising a video with corresponding audio on how to replace a car battery.

A method may include receiving an image via an imaging device of the electronic device. A method may include receiving a second image via the imaging device. A method may include detecting an object in the image. A method may include detecting a second object in the second image. A method may include determining a contextual setting of the electronic device. A method may include querying a database stored in the electronic device for overlay data related to the object based on the contextual setting. A method may include, when the overlay data is stored in the database, retrieving the overlay data from the database. A method may include, when the overlay data is stored on a remote electronic device, sending a message to a second electronic device, the message including identification data of the object and a request for the overlay data, and receiving the overlay data from the remote electronic device via the second electronic device. A method may include sending a second message to the second electronic device, the second message including second identification data of the second object and a request for second overlay data. A method may include receiving the second overlay data from the remote electronic device via the second electronic device. A method may include visually associating the overlay data with the object on a display of the electronic device. A method may include visually associating the second overlay data with the second object on the display.

A method may include to receiving an image via an imaging device of the electronic device. A method may include detecting an object in the image. A method may include receiving a user identification. A method may include determining a contextual setting of the electronic device based on the user identification. A method may include querying a database stored in the electronic device for overlay data related to the object based on the contextual setting. A method may include, when the overlay data is stored in the database, retrieving the overlay data from the database. A method may include, when the overlay data is stored on a remote electronic device, sending a message to a second electronic device, the message including identification data of the object and a request for the overlay data, and receiving the overlay data from the remote electronic device via the second electronic device. A method may include visually associating the overlay data with the object on a display of the electronic device. A method may include receiving a second user identification. A method may include to determining a second contextual setting of the electronic device based on the user identification. A method may include receiving a second image via the imaging device. A method may include detecting the object in the second image. A method may include querying the database for second overlay data related to the object based on the second contextual setting. A method may include retrieving the second overlay data from the database. A method may include visually associating the second overlay data with the object on the display.

In various examples, a user of the AR device may provide a user identification to the AR Device. This may allow use of the device to be customized to particular users by modifying the contextual setting based on the user's interest after a successful user identification. The user identification may include a user name and password. The user identification may include biometrics. For example, biometrics may include facial recognition, iris recognition, or fingerprint identification. A family may thus share the AR device at different times, with the parents and children seeing different overlay data even for the same objects. A parent may log into the AR device, the contextual setting being determined appropriately for the parent, and see overlay data regarding the nutritional value for a box of cereal. A child may log into the same AR device, the AR device determining a different contextual setting for the child, and display the potential different items that may be found as toys or surprises in the same box of cereal.

A method may include receiving an image via an imaging device of the electronic device. A method may include detecting an object in the image. A method may include detecting a second object in the image. A method may include to determining a contextual setting of the electronic device. A method may include querying a database stored in the electronic device for overlay data related to the object based on the contextual setting. A method may include querying the database for second overlay data related to the second object based on the contextual setting. A method may include, when the overlay data is stored in the database, retrieving the overlay data from the database. A method may include retrieving the second overlay data from the database. A method may include, when the overlay data is stored on a remote electronic device, sending a message to a second electronic device, the message including identification data of the object and a request for the overlay data, and receiving the overlay data from the remote electronic device via the second electronic device. A method may include visually associating the overlay data with the object on a display of the electronic device. A method may include visually associating the second overlay data with the second object on the display during the visual association of the overlay data with the object on the display.

In various examples, multiple objects may be detected in the image. Based upon settings of the AR device, multiple overlay data corresponding to the multiple objects may be displayed at the same time. Overlay data for one object may come from a database stored on the AR device, while overlay data from another object may come from a remote electronic device. The remote electronic device may retrieve the overlay data from its own database or a connected database. In retrieving overlay data from the remote electronic device, the AR device may send a message to the remote electronic device requesting overlay data. The message may include identification data of the object for which overlay data is being requested. The identification data may include the image being processed by the AR device or a cropped image showing the object. The identification data may include processed data, such as the form and shape of the object, a mesh outline of the object, or other unique features of the object. Such identification data may be compared against a reference image or reference data in identifying the object. The AR device may have identified what the object is but not have overlay data for the object. The identification data may be a globally unique identifier (GUID) identifying the object. The specific identification data used may depend on how other aspects of the AR device are implemented.

Figure 3:
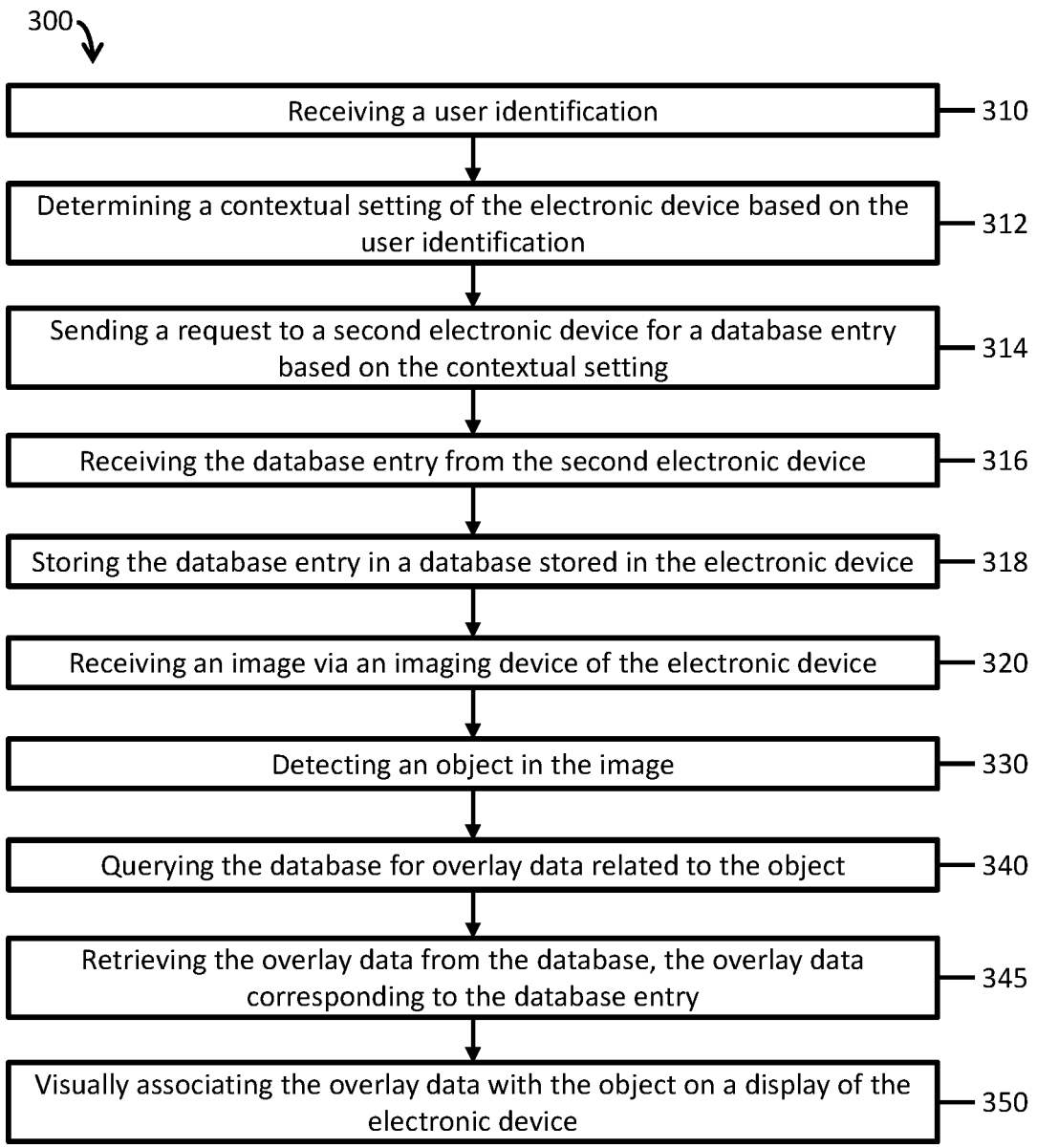
FIG. 3 shows a flow diagram of a method to retrieve overlay data from a database with a database entry based on a contextual setting in accordance with various examples.

FIG. 3 shows a flow diagram of a method 300 to retrieve overlay data from a database with a database entry based on a contextual setting in accordance with various examples. The method 300 includes receiving a user identification (310). The method 300 includes determining a contextual setting of the electronic device based on the user identification (312). The method 300 includes sending a request to a second electronic device for a database entry based on the contextual setting (314). The method 300 includes receiving the database entry from the second electronic device (316). The method 300 includes storing the database entry in a database stored in the electronic device (318). The method 300 includes receiving an image via an imaging device of the electronic device (320). The method 300 includes detecting an object in the image (330). The method 300 includes querying the database for overlay data related to the object (340). The method 300 includes retrieving the overlay data from the database, the overlay data corresponding to the database entry (345). The method 300 includes visually associating the overlay data with the object on a display of the electronic device (350).

In various examples, the database entries present on the AR device may be based on the contextual setting. When the contextual setting is determined, database entries may be requested from the second electronic device based on the contextual setting. Database entries that do not correspond to the contextual setting may be removed from the database on the AR device. Caching may be used to store database entries that do not correspond to the current contextual setting, but correspond to a contextual setting that is often encountered. Database entries corresponding to a contextual setting including a work component or a home component may remain stored on the AR device rather than adding and deleting the database entries frequently. Database entries may also be pre-loaded when a contextual setting change is anticipated. For example, database entries related to restaurants may be pre-loaded an hour before the contextual setting is changed to include a restaurant component. A direction of travel may also be considered, thus when a user travels between cities, database entries for restaurants in cities further down the road may be loaded into the database on the AR device rather than database entries for restaurants that have already been passed.

A method may include receiving a user identification, wherein the user identification includes a login name and a password. A method may include determining a contextual setting of the electronic device based on the user identification. A method may include sending a request to a second electronic device for a database entry based on the contextual setting. A method may include receiving the database entry from the second electronic device. A method may include storing the database entry in a database stored in the electronic device. A method may include receiving an image via an imaging device of the electronic device. A method may include detecting an object in the image. A method may include querying the database for overlay data related to the object. A method may include retrieving the overlay data from the database, the overlay data corresponding to the database entry. A method may include visually associating the overlay data with the object on a display of the electronic device. A method may include receiving a time of day from a time source. A method may include determining a second contextual setting of the electronic device based on the user identification and the time of day. A method may include sending a second request to a second electronic device for a second database entry based on the second contextual setting. A method may include removing the database entry from the database in response to determining the second contextual setting. A method may include receiving the second database entry from the second electronic device. A method may include storing the second database entry in the database. A method may include receiving a second image via the imaging device. A method may include detecting the object in the second image. A method may include determining that the overlay data and the second overlay data are stored in the database and correspond to the object. A method may include selecting the second overlay data to be displayed on the display based on the determination of the second contextual setting. A method may include visually associating a second overlay data with the object on the display, the second overlay data corresponding to the second database entry.

Figure 4:
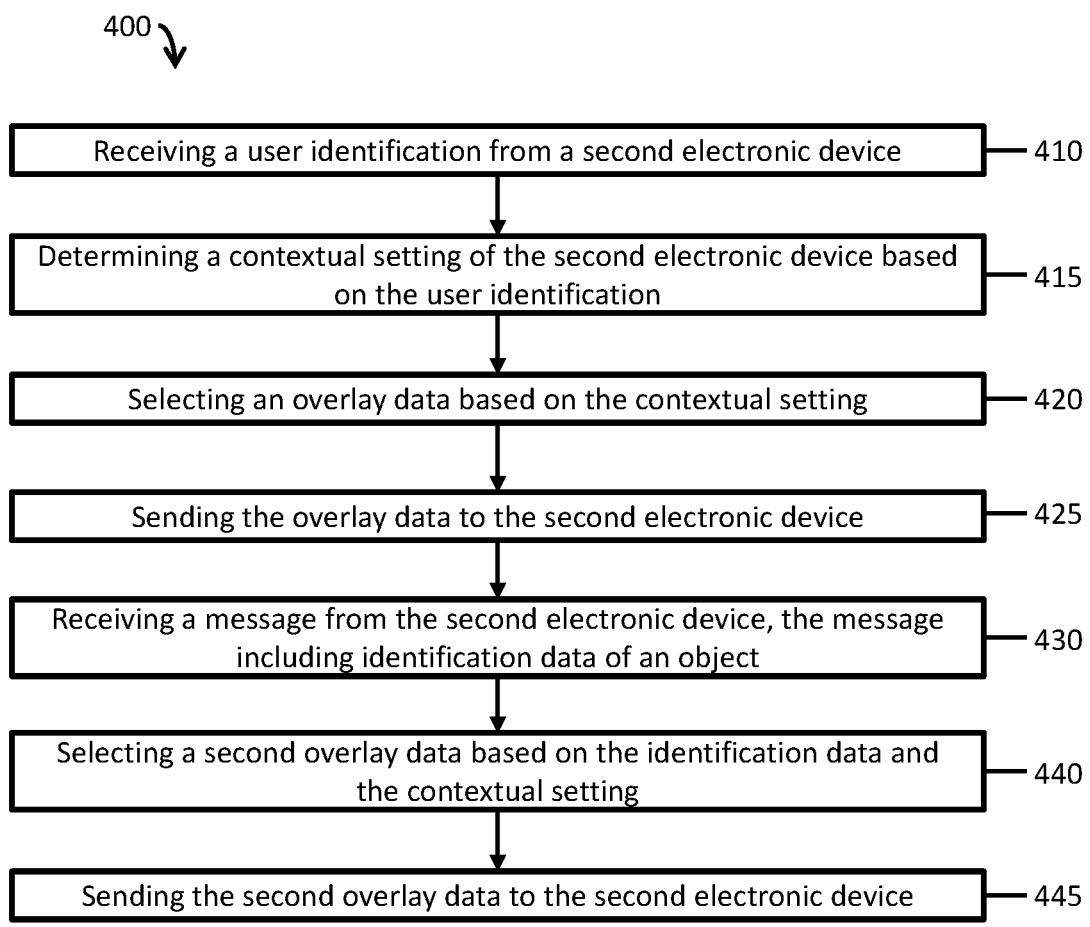
FIG. 4 shows a flow diagram of a method to send overlay data to a second electronic device based on a contextual setting in accordance with various examples.

FIG. 4 shows a flow diagram of a method 400 to send overlay data to a second electronic device based on a contextual setting in accordance with various examples. The method 400 includes receiving a user identification from a second electronic device (410). The method 400 includes determining a contextual setting of the second electronic device based on the user identification (415). The method 400 includes selecting an overlay data based on the contextual setting (420). The method 400 includes sending the overlay data to the second electronic device (425). The method 400 includes receiving a message from the second electronic device, the message including identification data of an object (430). The method 400 includes selecting a second overlay data based on the identification data and the contextual setting (440). The method 400 includes sending the second overlay data to the second electronic device (445).

In various examples, a server, local processing device, or comparable device may determine the contextual setting of the AR device. A server may be located remotely from the AR device and accessed via the Internet. A local processing device may provide processing power for the AR device. For example, the AR device may comprise a visor or headset, while a local processing device may comprise a cell phone, laptop or desktop computer, or a processing device custom-designed and paired to the AR device to perform a portion of the processing. This may enable an AR device to have less weight, as the processing is performed by a local processing device, which may be located in the same room or attached to the belt or in the pocket of the user. Such a system may also connect to a remote server that stores additional overlay data. The local processing device or server may determine the contextual setting of the AR device. The local processing device or server may receive a message including identification data or the entire image captured by the AR device and send corresponding overlay data to the AR device for display.

In various examples, the display, processor, computer-readable medium, and imaging device may be coupled together but not placed in the same physical housing. This may allow the modularization of the AR device, potentially allowing easy upgrading or replacement of components. This may allow the processor to service multiple displays for different users.

A method may include receiving a user identification from a second electronic device. A method may include determining a contextual setting of the second electronic device based on the user identification. A method may include selecting an overlay data based on the contextual setting. A method may include sending the overlay data to the second electronic device. A method may include receiving a message from the second electronic device, the message including identification data of an object. A method may include selecting a second overlay data based on the identification data and the contextual setting. A method may include sending the second overlay data to the second electronic device. A method may include analyzing an e-mail in an e-mail account based on the user identification to identify a topic of interest corresponding to the user identification. A method may include selecting a third data overlay based on the topic of interest. A method may include sending the third data overlay to the second electronic device.

In various examples, the AR device or associated systems may identify topics of interest to a user. These topics of interest may be used to update the contextual setting based on the user. A user may be associated with an e-mail account, a web browser history, a calendar, text messages, a phone conversation, or other information. This information may be analyzed to determine topics of interest to the user or events occurring in the user's life. For example, an e-mail search may reveal the user regularly discusses cars over e-mail, thus the contextual setting for the user may include a car component that identifies makes, years, and models of cars. The calendar may indicate an anniversary or birthday coming up, causing the contextual setting to bring up a reminder or suggestion when passing by or entering stores. Machine learning may be used in association with processing such data and predicting topics the user may be interested in. Based on such predictions, objects may be added to a database for use by the AR device when that user is logged in. The user may be provided with a notification requesting user confirmation of a topic of interest suggested by machine learning. Machine learning may also be used to identify and remove objects from the database when the user is no longer interested in those topics. A user may also indicate topics of interest. For example, part of the configuration for a new user may include selecting topics of interest from a set of topics for which overlay data is available. The user may modify the topics of interest as the user's interest change or as the overall system incorrectly identifies a topic the user is not interested in. As association between the user identification and these topics of interest may be stored, such as in a user profile or user settings.

A method may include receiving a user identification from a second electronic device. A method may include determining a contextual setting of the second electronic device based on the user identification. A method may include selecting an overlay data based on the contextual setting. A method may include sending the overlay data to the second electronic device. A method may include receiving a message from the second electronic device, the message including identification data of an object. A method may include selecting a second overlay data based on the identification data and the contextual setting. A method may include sending the second overlay data to the second electronic device. A method may include receiving a message indicating a topic of interest corresponding to the user identification. A method may include storing an association between the user identification and the topic of interest. A method may include selecting a third data overlay based on the topic of interest. A method may include sending the third data overlay to the second electronic device.

A method may include receiving a user identification from a second electronic device. A method may include determining a contextual setting of the second electronic device based on the user identification. A method may include selecting an overlay data based on the contextual setting. A method may include sending the overlay data to the second electronic device. A method may include receiving a message from the second electronic device, the message including identification data of an object. A method may include selecting a second overlay data based on the identification data and the contextual setting. A method may include sending the second overlay data to the second electronic device. A method may include receiving a time of day from a time source. A method may include determining a second contextual setting of the second electronic device based on the user identification and the time of day. A method may include sending a message to the second electronic device indicating a change of the contextual setting of the second electronic device. A method may include selecting a third data overlay based on the second contextual setting. A method may include sending the third data overlay to the second electronic device.

A method may include receiving a user identification from a second electronic device. A method may include determining a contextual setting of the second electronic device based on the user identification. A method may include selecting an overlay data based on the contextual setting. A method may include sending the overlay data to the second electronic device. A method may include receiving a message from the second electronic device, the message including identification data of an object. A method may include selecting a second overlay data based on the identification data and the contextual setting. A method may include sending the second overlay data to the second electronic device. A method may include receiving a second message from the second electronic device, the second message including second identification data of a second object. A method may include searching for a third overlay data based on the contextual setting and the second identification data. A method may include designating the second identification data for overlay processing based on the search.

In various examples, the user may be interested in an object for which no overlay data is present or a different kind of overlay data is desired. The user may be interested in cars, and the AR device may display makes, models, and years for cars. As new cars are released, the AR device may be able to identify the car as a car, but be unable to identify the make, model, and year, as it has not yet been entered into the overall system. The AR device may thus request overlay data for the car that is not yet available. A server may keep track of such requests that cannot be found in a search for overlay data and designate the identification data corresponding to that object for overlay processing. The overlay processing may be automated or involve human interaction. The overlay processing may include determining whether there is an error in the system and a known object is not being properly identified due to poor lighting or damage, such as a car that has been in a wreck. The overlay processing may include determining that the object is not in the overall system's databases and should be added. The overlay processing may include determining that the object is in the overall system databases, but that additional overlay data should be added to correspond to different contextual settings. This determination may be based on user interactions with AR devices, indicating that additional overlay data or a particular type of overlay data is desired. This may benefit the overall systems by automating the process of identifying missing objects or missing overlay data. As such missing data is flagged, it can be designated for overlay processing to potentially expand the databases used by the overall system. In some examples, the object may be known and have overlay data, but it may be useful to add data regarding a component of the object. A car may be known and have overlay data, but it may be useful to also identify and have overlay data about the tires, the engine, the battery, or even a specific screw or bolt in the engine.

In various examples a single AR device or application may be used across a wide variety of contextual settings. Instead of manually swapping between devices when one is working versus lounging at home, or when one wants information about restaurants versus information about the cars in the restaurant parking lot, a single AR device and application may be used. The information that is displayed may change based on the determined contextual setting. This may also allow overlay data to be displayed about both the restaurant and cars in the restaurant parking lot at the same time.

Figure 5:
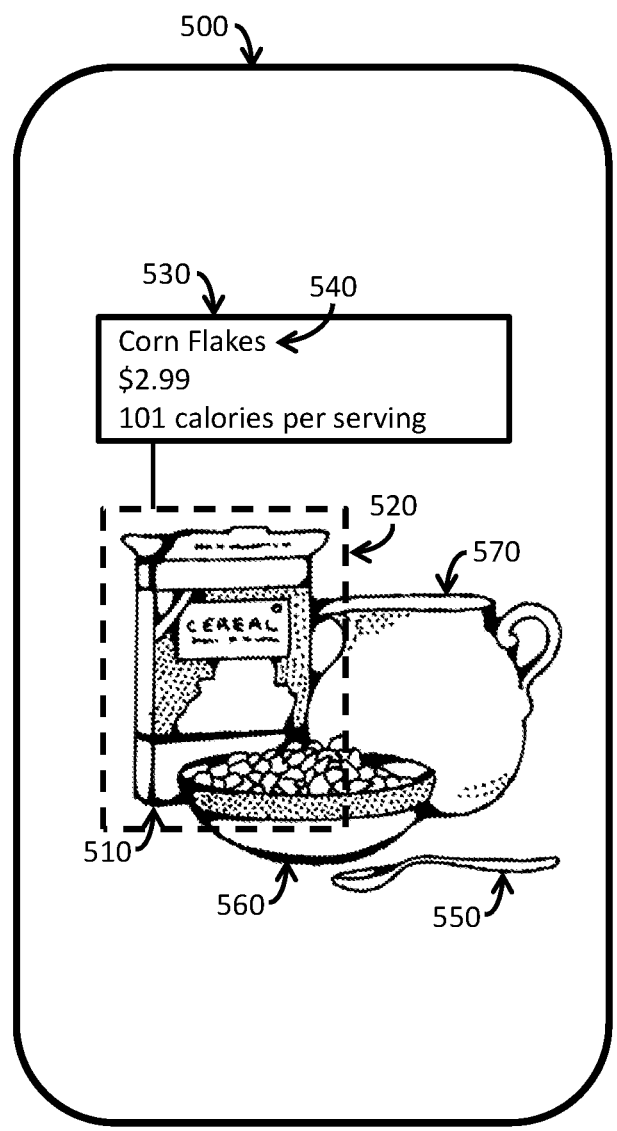
FIG. 5 shows a display with overlay data in accordance with various examples.

FIG. 5 shows a display 500 with overlay data 540 in accordance with various examples. Display 500 may be part of a cell phone running an AR application. The camera of the cell phone may capture an image at breakfast. The image may include objects such as a box of cereal 510, a bowl 560 containing cereal, a spoon 550, and a container 570 with milk. The AR application may detect the box of cereal 510 as an object in the image. The AR application may retrieve overlay data 540 related to the box of cereal 510. The overlay data 540 may include, for instance, information about the name of the object, the price of the object, and nutritional information (e.g., a calorie count) for food. The AR application may display the overlay data 540 on the display 500 and visually associate the overlay data 540 with the object. The overlay data 540 may be displayed as part of a text box 530 added to the image. The text box 530 may have a transparent, translucent, or opaque background. The overlay data 540 may be visually associated with the object by overlaying a shape, such as a dotted box 520, around the object on the image and by overlaying a line coupling the dotted box 520 and the text box 530. The AR application may identify additional objects in the image, such as the spoon 550. Overlay data may be available for the spoon 550, but may not be displayed. Display of overlay data may be limited to prevent cluttering of the display 500. The AR application may determine the most relevant objects or most relevant overlay data based on the contextual setting of the cell phone.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium comprising machine-readable instructions that, when executed by a controller of a first electronic device, cause the controller to:
   receive an image via an imaging device of the first electronic device;
   detect an object in the image;
   detect a change in a contextual setting of the first electronic device from a first contextual setting to a second contextual setting based on a time of day identified by a time source associated with the first electronic device;
   query a database stored in the first electronic device for first overlay data related to the object based on the second contextual setting;
   when the first overlay data is stored in the database, retrieve the first overlay data from the database;
   when the first overlay data is not stored in the database:
   send a message to a second electronic device, the message including identification data of the object and a first request for the first overlay data; and
   receive the first overlay data from the second electronic device; and
   cause the first overlay data to be presented with the object on a display of the first electronic device.

2. The non-transitory computer-readable medium of claim 1, wherein the machine-readable instructions, when executed by the controller, cause the controller to:
   receive a second image via the imaging device;
   detect a second object in the second image;
   send a second message to the second electronic device, the second message including second identification data of the second object and a second request for second overlay data;
   receive the second overlay data from the second electronic device; and
   cause the second overlay data to be presented with the second object on the display.

3. The non-transitory computer-readable medium of claim 1, wherein the machine-readable instructions, when executed by the controller, cause the controller to:
   receive a first user identification; and
   determine the second contextual setting based on the first user identification.

4. The non-transitory computer-readable medium of claim 3, wherein the machine-readable instructions, when executed by the controller, cause the controller to:
   receive a second user identification;
   determine a third contextual setting of the first electronic device based on the second user identification;
   receive a second image via the imaging device;
   detect the object in the second image;
   query the database for second overlay data related to the object based on the third contextual setting;
   retrieve the second overlay data from the database; and
   cause the second overlay data to be presented with the object on the display.

5. The non-transitory computer-readable medium of claim 1, wherein the machine-readable instructions, when executed by the controller, cause the controller to:
   detect a second object in the image;
   query the database for second overlay data related to the second object based on the second contextual setting;
   retrieve the second overlay data from the database; and
   cause the second overlay data to be presented with the second object on the display during the presentation of the first overlay data with the object on the display.

6. A non-transitory computer-readable medium comprising machine-readable instructions that, when executed by a controller of a first electronic device, cause the controller to:
   receive a user identification;
   determine a first contextual setting of the first electronic device based on the user identification;
   send a first request to a second electronic device for a first database entry based on the first contextual setting;
   receive the first database entry from the second electronic device;
   store the first database entry in a database stored in the first electronic device;
   remove a second database entry from the database in response to determining the first contextual setting;
   receive an image via an imaging device of the first electronic device;
   detect an object in the image;

query the database for first overlay data related to the object;

retrieve the first overlay data from the database, the first overlay data corresponding to the first database entry; and cause the first overlay data to be presented with the object on a display of the first electronic device.

7. The non-transitory computer-readable medium of claim 6, wherein the machine-readable instructions, when executed by the controller, cause the controller to:

receive a time of day from a time source;

determine a second contextual setting of the first electronic device based on the user identification and the time of day;

send a second request to the second electronic device for a third database entry based on the second contextual setting;

receive the third database entry from the second electronic device;

store the third database entry in the database;

receive a second image via the imaging device;

detect the object in the second image; and visually associate second overlay data with the object on the display, the second overlay data corresponding to the third database entry.

8. The non-transitory computer-readable medium of claim 7, wherein the machine-readable instructions, when executed by the controller, cause the controller to:

determine that the first overlay data and the second overlay data are stored in the database and correspond to the object; and select the second overlay data for presentation on the display based on the determination of the second contextual setting.

9. The non-transitory computer-readable medium of claim 6, wherein the user identification includes a login name and a password.

10. A non-transitory computer-readable medium comprising machine-readable instructions that, when executed by a controller of a first electronic device, cause the controller to:

receive a user identification from a second electronic device;

determine a first contextual setting of the second electronic device based on the user identification;

select first overlay data based on the first contextual setting;

send the first overlay data to the second electronic device;

receive a message from the second electronic device, the message including identification data of an object;

select second overlay data based on the identification data and the first contextual setting;

send the second overlay data to the second electronic device;

receive a first message indicating a topic of interest corresponding to the user identification;

store an association between the user identification and the topic of interest;

select third overlay data based on the topic of interest; and send the third overlay data to the second electronic device.

11. The non-transitory computer-readable medium of claim 10, wherein the machine-readable instructions, when executed by the controller, cause the controller to:

analyze an e-mail in an e-mail account based on the user identification to identify the topic of interest corresponding to the user identification.

12. The non-transitory computer-readable medium of claim 10, wherein the machine-readable instructions, when executed by the controller, cause the controller to:

receive a time of day from a time source;

determine a second contextual setting of the second electronic device based on the user identification and the time of day;

send a message to the second electronic device indicating a change of the contextual setting of the second electronic device from the first contextual setting to the second contextual setting;

select fourth overlay data based on the second contextual setting; and send the fourth overlay data to the second electronic device.

13. The non-transitory computer-readable medium of claim 10, wherein the machine-readable instructions, when executed by the controller, cause the controller to:

receive a second message from the second electronic device, the second message including second identification data of a second object;

search for fourth overlay data based on the first contextual setting and the second identification data; and designate the second identification data for overlay processing based on the search.

* * * * *